(12) United States Patent
Spierdijk

(10) Patent No.: US 10,625,192 B2
(45) Date of Patent: *Apr. 21, 2020

(54) VACUUM INSTALLATION

(71) Applicant: Koks Group B.V., Alkmaar (NL)

(72) Inventor: Nic Spierdijk, Broek op Langedijk (NL)

(73) Assignee: Koks Group B.V., Alkmaar (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,732

(22) Filed: Jul. 9, 2018

(65) Prior Publication Data

US 2018/0311603 A1    Nov. 1, 2018

Related U.S. Application Data

(63) Continuation of application No. 15/072,553, filed on Mar. 17, 2016, now Pat. No. 10,016,713.

(30) Foreign Application Priority Data

Mar. 17, 2015    (NL) ..................................... 2014477

(51) Int. Cl.
*B01D 46/00*    (2006.01)
*B01D 45/08*    (2006.01)
(Continued)

(52) U.S. Cl.
CPC ........ *B01D 46/0068* (2013.01); *A47L 9/1641* (2013.01); *A47L 9/1683* (2013.01); *A47L 9/2842* (2013.01); *B01D 45/16* (2013.01); *B01D 46/0019* (2013.01); *B01D 50/002* (2013.01); *B04C 3/04* (2013.01); *B04C 5/28* (2013.01); *B04C 9/00* (2013.01); *B04C 11/00* (2013.01);
(Continued)

(58) Field of Classification Search
CPC ........ B01D 46/00; B01D 45/08; B01D 45/12; B01D 45/16; B01D 50/00; B01D 46/0068; B01D 46/0019; B04C 5/28; B04C 9/00; B04C 11/00; B04C 3/04; B04C 2009/008; A47L 9/16; A47L 9/28; A47L 9/1683
USPC .......... 55/314, 302, 324, 356, 345, DIG. 34; 96/382, 417; 95/284; 137/242, 613; 251/212
See application file for complete search history.

(56) References Cited

U.S. PATENT DOCUMENTS 3,885,932 A    5/1975    Moore et al.
3,973,935 A    8/1976    Moore et al.
(Continued)

OTHER PUBLICATIONS

NL Search Report, dated Nov. 16, 2015, from corresponding NL application.

*Primary Examiner* — Minh Chau T Pham
(74) *Attorney, Agent, or Firm* — N.V. Nederlandsch Octrooibureau; Catherine A. Shultz; Katelyn J. Bernier

(57) ABSTRACT

A vacuum installation includes a vacuum chamber having an inlet for aspirating a quantity of liquid or particulate material. A cyclone separation unit having a plurality of cyclones, communicating in parallel with the interior of the vacuum chamber is connected to a vacuum pump to draw air from the vacuum chamber through the cyclones and induce a separating vortex flow within the cyclones. A controller is arranged to control the vacuum pump to provide a chosen flow rate and to selectively deactivate one or more of the cyclones according to the chosen flow rate.

21 Claims, 5 Drawing Sheets

(51) Int. Cl.
*B01D 45/12* (2006.01)
*B01D 50/00* (2006.01)
*B04C 5/28* (2006.01)
*B04C 9/00* (2006.01)
*B04C 11/00* (2006.01)
*B04C 3/04* (2006.01)
*A47L 9/16* (2006.01)
*A47L 9/28* (2006.01)
*B01D 45/16* (2006.01)
*E01H 1/08* (2006.01)

(52) U.S. Cl.
CPC .. *B04C 2009/002* (2013.01); *B04C 2009/005* (2013.01); *B04C 2009/008* (2013.01); *E01H 1/0827* (2013.01)

(56) References Cited

U.S. PATENT DOCUMENTS

| | | | |
|---|---|---|---|
| 4,723,969 | A | 2/1988 | DeMarco |
| 4,904,126 | A * | 2/1990 | Voith ................ B01D 46/0068 406/39 |
| 5,996,171 | A | 12/1999 | Bowers |
| 6,569,217 | B1 | 5/2003 | DeMarco |
| 8,029,584 | B2 * | 10/2011 | Castronovo .......... A47L 9/1418 251/212 |
| 9,981,214 | B2 * | 5/2018 | King, Jr. ............ B01D 46/0068 |
| 10,016,713 | B2 * | 7/2018 | Spierdijk ................. B04C 5/28 |
| 2003/0131571 | A1 | 7/2003 | DeMarco |
| 2005/0274094 | A1 | 12/2005 | DeMarco |
| 2007/0226950 | A1 | 10/2007 | DeMarco |
| 2007/0234906 | A1 | 10/2007 | DeMarco |
| 2008/0028940 | A1 * | 2/2008 | Han ...................... B01D 45/16 96/417 |
| 2013/0192467 | A1 | 8/2013 | Lyras |

* cited by examiner

VACUUM INSTALLATION

CROSS-REFERENCE TO RELATED APPLICATIONS

This is a Continuation of U.S. patent application Ser. No. 15/072,553, filed on Mar. 17, 2016, now U.S. Pat. No. 10,016,713 B2, which claims foreign priority to The Netherlands Patent No. 2014477 B1, filed on Mar. 17, 2015.

BACKGROUND OF THE INVENTION

1. Field of the Invention

The present invention relates to a vacuum installation provided with a cyclone separation unit and more particularly to a cyclone separation unit that can handle different flow rates and allows effective real-time flushing. The invention also relates to the use of such a device.

2. Description of the Related Art

Vacuum installations, which can be provided on a truck or another kind of vehicle, or as self-supporting independently working units, are used in various capacities for aspirating liquids and particulate materials. They may also be operated in reverse as blowers for delivering particulate material should this be required. The vacuum installations function as air displacement systems and are designed for heavy industrial applications. Such vacuum installations are suitable for suctioning, displacement, transport and/or upload of dry, wet and/or hazardous substances, such as various types of chemical catalysts and/or liquids, gravel, powders, fly ash and sludges. Various configurations exist but in general, all such vacuum installations or vacuum trucks are provided with some form of vacuum chamber to which a vacuum is applied using a vacuum pump of appropriate size for the operation concerned. The vacuum chamber is provided with one or more inlets through which the material to be aspirated may enter the vacuum chamber. This will usually be in the form of a pipe coupling to which a flexible pipe can be attached. As with a household vacuum cleaner, some form of separator must be present between the vacuum chamber and the vacuum pump in order to avoid aspirated material being entrained in the flow through the vacuum pump to the exterior. In existing vacuum trucks, baffles may be provided within the vacuum chamber to encourage large particulates to settle. Filters of various grades may be provided in the vacuum lines leading to the vacuum pump. These may require periodic cleaning to avoid them from becoming blocked.

Another form of separator that has also been used in vacuum trucks is the centrifugal or cyclone type separator. A cyclone separator uses a cyclone chamber with a tangential inlet to create a high speed vortex flow. Particles of solids or liquids will be forced towards the outside of the vortex and relatively clean air is aspirated axially upwards from the centre of the vortex. The cyclone chamber usually has a conical base where the separated materials are funnelled through an outlet leading to a collector below the cyclone chamber. It is noted that filters may still be required downstream from the cyclone to prevent residual particles from entering the vacuum pump. These filters need regular cleaning, which interrupts the operation of the vacuum installation. U.S. Pat. No. 5,996,171 illustrates a vacuum truck system that includes two cyclone separators, each having its own filter that can be alternately flushed. A common final filter cannot be cleaned in this manner. Cyclone separators are very effective in separating large volumes of materials cleanly without relying on a filter as the primary separator. Nevertheless, they can be sensitive to the particular flow conditions. Below a given flow rate the cyclone may not work effectively while at higher flow rates they may become choked, limiting the maximum flow rate at this value.

It would be desirable to provide an improved vacuum installation that alleviated some or all of the above problems.

BRIEF SUMMARY OF THE INVENTION

According to the invention there is provided a vacuum installation comprising: a vacuum chamber having an inlet for aspirating a quantity of liquid or particulate material; a cyclone separation unit comprising a plurality of cyclones, communicating in parallel to each other with the interior of the vacuum chamber; a vacuum pump connected to the cyclone separation unit to draw air from the vacuum chamber through the cyclones to induce a separating vortex flow within the cyclones; and a controller, arranged to control the vacuum pump to provide a chosen flow rate, the controller being further arranged to selectively deactivate one or more of the cyclones. In the following, although reference is given to air, it will be understood that this may also include other gases e.g. in the case that operation takes place under a protective atmosphere such as nitrogen.

According to the invention, the controller may thus be arranged to selectively deactivate one or more of the cyclones in order to adapt the flow rate through the remaining cyclones to an optimal flow rate. In this manner the number of active cyclones and their individual capacities may be chosen such that the total capacity matches the demanded flow through the vacuum pump. This may be set by the operator choosing a given operational speed for the vacuum pump or by setting a desired flow rate. In this context it is noted that although a single vacuum pump is mentioned, there may be additional vacuum pumps too and these may also be selectively activated to reach the desired flow rate.

The vacuum installation may function as an air displacement system and may be designed for heavy industrial applications. The vacuum installation may be provided on a truck or other vehicle, or as a stand-alone or self-supported unit. Such vacuum installations may be suitable for suctioning, displacement, transport and/or upload or dry, wet and hazardous substances, such as various types of catalysts, gravel, powders, fly ash and sludges, and especially for use in the ((petro)-chemical) industry. However, industrial cleaning using a vacuum installation may be used in all kinds of industrial sectors. Examples of applications in which such a vacuum installation may be used include, but are not limited to, emergency cleaning, cleaning sewers and drains, silo cleaning, surface water cleaning, blast furnace slag removal and ballast suction. The vacuum installation may be executed to obey one or more of the following guidelines or regulations: PED (Pressure Equipment Directive 97/23/EC (July 2016 PED 2014/68/EU)), ASME (American Society of Mechanical Engineers) Boiler & Pressure Vessel Code (BPVC), ADR (Ceoc) (Accord europeen relatif au transport international) EN 12195-1:2010, ATEX-Guideline 94/9/EG-ATEX-Guideline 1999/92/EG. In one embodiment, the vacuum installation is a high vacuum installation. This may be defined as an installation that operates with a vacuum pump operable to a vacuum of 0.6 bar and higher. In this context, the vacuum pump must be other than a simple fan based device and may be a gear or lobe pump or a liquid-ring pump or the like. The vacuum pump has a vacuum pump inlet connected to the cyclone separation unit and may also be provided with a pre-inlet, communicating with a source of air or other fluid and with a vacuum pump outlet. In operation, air is drawn into the vacuum pump through the vacuum pump inlet and air or liquid is aspirated through the pre-inlet, and exhausted through the vacuum pump outlet. Each of the three connections to the vacuum pump may be provided with an appropriate silencer.

The cyclones may all be identical whereby each cyclone is rated to operate at the same optimal flow rate. Any number of cyclones may be present, in particular, two, three four or eight cyclones may be particularly favourable. In an alternative, the cyclones may be of different capacities such that by choosing different cyclones a greater variation of flow rates may be achievable.

According to one aspect of the invention, the controller may be arranged to control the flow rate through the vacuum pump to a plurality of preselected flow rates each corresponding to a number of activated cyclones. In an alternative arrangement, the vacuum pump may be adjustable to any desired flow rate whereby the controller activates selected cyclones to best match the desired flow rate.

According to a still further aspect of the invention, the controller may be arranged to selectively deactivate one or more of the cyclones in order to back-flush the deactivated cyclones while continuing to aspirate through active cyclones. Back-flushing may be desirable for various reasons but is particularly useful for clearing built-up materials from the collector of the cyclone, from the filters and other locations in the aspiration path between the vacuum chamber and the vacuum pump. Since the cyclones are connected to the vacuum chamber in parallel, some cyclones may be back-flushed while other cyclones continue to operate normally. Back-flushing may be momentary in the form of an air-shock which can usefully serve to dislodge collected particles. The air-shock may be set to between 0.1 and 2 seconds, preferably around 0.5 seconds, depending e.g. upon the nature of the product being aspirated. This is in contrast to operation of the installation below its maximum capacity, in which case one or more cyclones may remain deactivated for an extended period. Alternatively the back-flush may be prolonged or even continuous should such a flow be beneficial to the overall process. In this context, although reference is given to an air-shock, this may be a shock of any gas e.g. nitrogen, in the case that the vacuum truck is operating under a protective atmosphere.

In one embodiment, the cyclone separation unit comprises a plurality of collectors arranged to receive the separated material each provided with a respective flush valve connecting the collector back to the vacuum chamber. The controller can be configured to selectively open or close the flush valves to back-flush the separated material from one or more of the collectors back into the vacuum chamber. It will be understood that in this configuration, the incoming tangential flow from the vacuum chamber to the respective cyclone may be shut off while the flush valve is opened. At the same time, the respective cyclone should be disconnected from the vacuum pump e.g. by an aspiration valve arrangement as further described below. Operation of the back-flush through the collector may be periodic or may be in response to detection of a quantity of built-up material within the collector. Level sensors may be provided to indicate to the controller once a given level within the collector has been reached and initiate the back-flush in response.

According to a still further aspect of the invention, the vacuum installation may comprise a plurality of filters between the cyclones and the vacuum pump. Although the cyclones may remove the majority of particles some contamination may remain and such filters can serve to protect the vacuum pump and the environment. The filters may be high performance particulate air filters (HEPA) or may be ATEX certified for flame prevention. It will be understood that the finer the filter, the greater may be its effect on the overall performance and pressure drop. Once this filter becomes clogged, the overall performance of the vacuum installation may reduce considerably. The controller is preferably arranged to back flush air through one or more of the filters, while other filters remain operational. This may take place sequentially for each filter in turn or may take place in a continuous random process. Back-flushing of the filters may take place at the same time as back-flushing of the cyclones and collectors or independently thereof. In particular, back-flushing of the filters may take place in response to measurements of pressure drop across the respective filters, whereby clogging of the filter may be detected. In existing filter based systems it may be necessary to completely change all of the filters on completing one operation and commencing another operation, in particular where the environment is sensitive to cross-contamination or regulations so require. As a result of the invention, the number of filter stages may be reduced whereby a change of filters is considerably less costly.

In order to provide a reverse flow of air through the filters and or the collectors and cyclones an aspiration valve arrangement may be provided allowing entry of atmospheric air or another appropriate gas towards the vacuum chamber. The aspiration valve arrangement may be provided for each filter or group of filters whereby a connection to the vacuum pump may be closed and a connection to the atmosphere may be opened. The controller can be arranged to selectively actuate a given aspiration valve arrangement associated with the deactivated cyclone or cyclones. In general, back-flushing will take place for the filters and the associated cyclones in a group together. Nevertheless, it is not excluded that only a filter or filters is back-flushed or only one or more cyclones.

In a particular embodiment of the vacuum installation, the cyclone separation unit comprises a plurality of cyclone blocks, each block having a collector serving a plurality of cyclones and the controller is arranged to selectively back flush each of the cyclone blocks. In one preferred configuration, two cyclone blocks are provided each having four cyclones in parallel connected to a single collector.

The cyclones in each cyclone block may each have their own filter but in a particular embodiment they may be connected together in parallel through the same filter to the vacuum pump. Furthermore, the cyclones in each cyclone block may then also be connected in parallel through the same aspiration valve arrangement to the vacuum pump. In such a configuration, one whole cyclone block may be back-flushed to clear the filter or filters and the collector, while the other cyclone block continues to aspirate.

The controller may be programmed to operate as desired. In particular, the cyclones may be activated and deactivated in sequence, while maintaining a relatively constant overall flow rate through the remaining cyclones. It is particularly desirable that all of the cyclones and valves is exposed to equal amounts of wear. This may be achieved by careful selection and distribution of duty cycles. In one embodiment, this is achieved by applying a continuous random process such that irrespective of how many cyclones are operating, they will all be exposed to the same overall duty cycle.

The invention also relates to a truck incorporating the vacuum installation described above and hereinafter and to a method of operating a vacuum installation to aspirate a quantity of liquid or particulate material. The method may comprise: operating the vacuum pump to provide a desired flow rate through the inlet and selectively deactivating one or more of the cyclones according to the flow rate in order to maintain a flow rate through the remaining cyclones within an optimal operating range.

As further described above and hereinafter, the method may further comprise back-flushing the one or more deactivated cyclones in order to clean at least part of the flow path. The cyclones may be selectively deactivated successively in any particular sequence. In particular, the cyclones may be activated and deactivated in a continuous random process.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
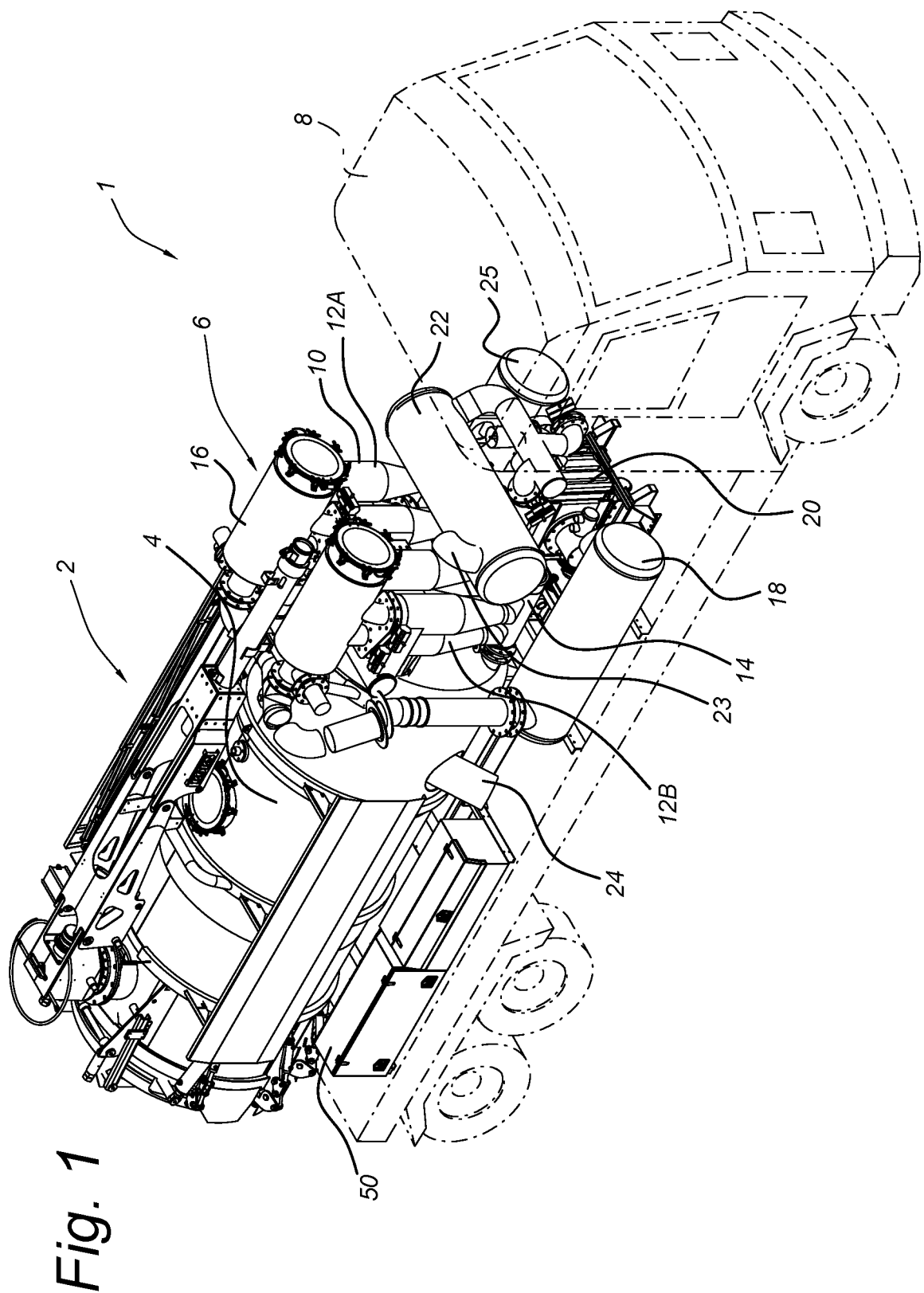
FIG. 1 shows a perspective view of a vacuum truck according to a first embodiment of the present invention.

FIG. 1 shows a perspective view of a vacuum truck 1 incorporating a vacuum installation 2. The vacuum installation 2 includes a vacuum chamber 4 mounted on the rear of the truck and a cyclone separation unit 6 mounted behind the cabin 8. The cyclone separation unit 6 is provided with a total of eight cyclones 10 arranged in two cyclone blocks 12A, B. Each cyclone block 12A, B is provided with a collector 14 and a filter 16, which are connected through a suction silencer 18 to a vacuum pump 20. The vacuum pump 20 is also provided with a pre-inlet silencer 22 and pre-inlet 23 and connected through an outlet silencer 25 to atmosphere. The vacuum chamber 4 is also provided with an inlet 24. It will be understood that various other inlets may be provided depending on the use to which the truck 1 is to be applied and that the truck 1 may have other conventional attachments and accessories as required. A controller 50 is provided to control operation of the installation 2.

Figure 2:
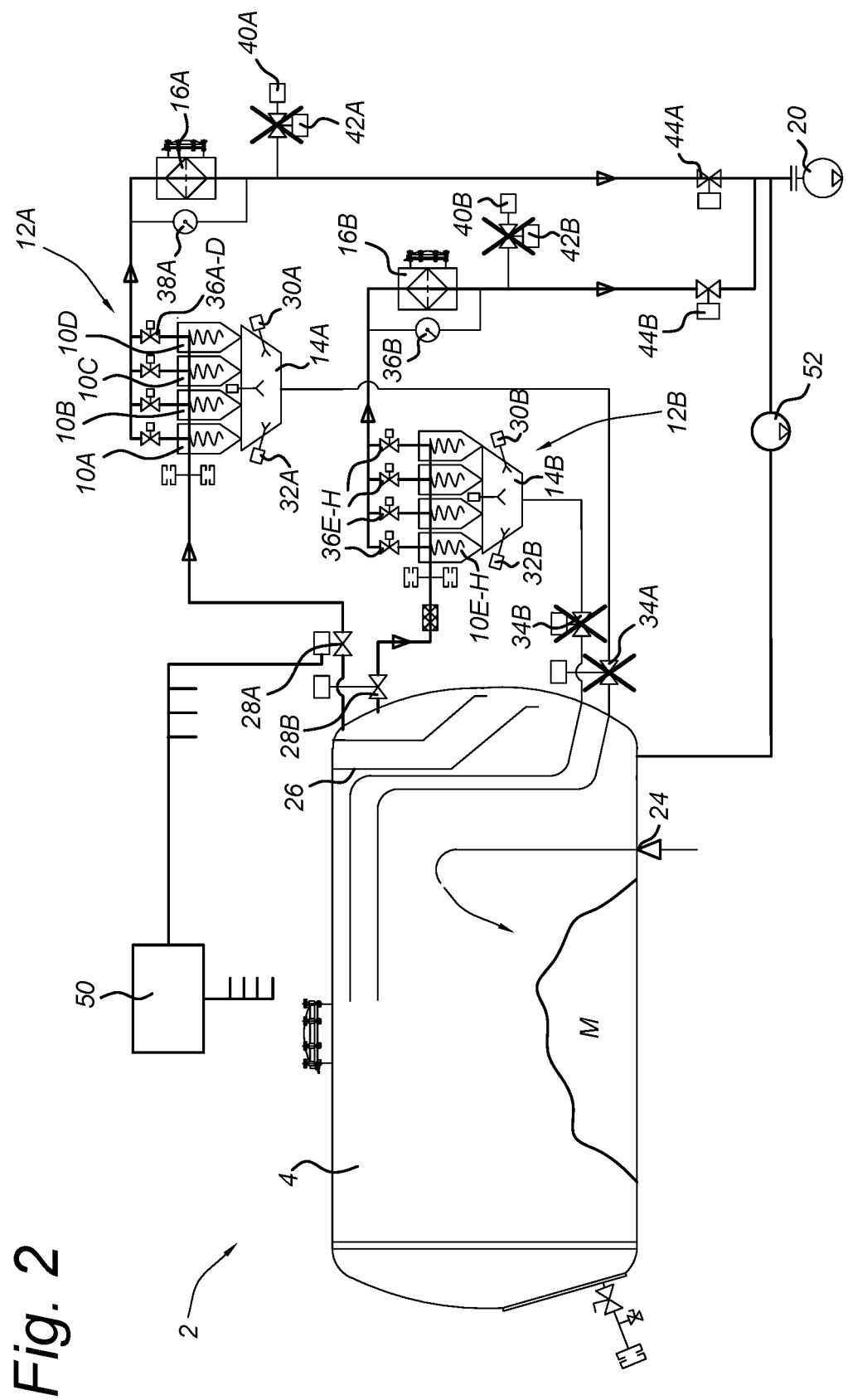
FIG. 2 shows a schematic view of the vacuum installation of FIG. 1 operating at full flow.

FIG. 2 shows a schematic view of the vacuum installation 2 of FIG. 1 in further detail showing the installation 2 in operation to aspirate material M through the inlet 24 at full flow. As can be seen, the inlet 24 is connected into the interior of the vacuum chamber 4, which also includes baffles 26 that deflect the flow and act as a first level preventive to allow the aspirated material M to settle within the vacuum chamber 4.

As can be seen, first cyclone block 12A includes four cyclones 10A-D which are otherwise conventional and will not be further described in detail. In the present embodiment, all cyclones are identical, having a nominal flow rate of 1100 m3/hour although it will be understood that cyclones having different capacities may be implemented. The cyclones 10A-D are connected in parallel via their tangential inlets to the upper side of the vacuum chamber 4 downstream from the baffles 26 via cyclone inlet valve 28A. Cyclones 10A-D have their lower axial outlets connected to a common collector 14A, which includes dry level detector 30A and liquid level detector 32A. Collector 14A is connected back to the interior of the vacuum chamber 4 via flush valve 34A, operation of which will be described in further detail below.

The upper axial outlets of the cyclones 10A-D are connected through cyclone selector valves 36A-D to filter housing 16A. The filter housing 16A can receive any appropriate filter elements, including HEPA and ATEX certified filters, according to the intended use of the vacuum truck 1. In particular, the filter housing 16A is readily opened in order to exchange, clean or otherwise service the filter elements. A pressure sensor 38A placed across the filter housing 16A provides an indication of the pressure drop across the filter housing 16A. Downstream of the filter housing 16A is provided an aspiration valve arrangement including a vent 40A connected to atmosphere, a vent valve 42A and a vacuum pump inlet valve 44A connected to the vacuum pump 20. The suction silencer 18, pre-inlet silencer 22, pre-inlet 23 and outlet silencer 25 have been omitted in this view for the sake of convenience. A flow demand sensor 52 is connected between the vacuum chamber 4 and the inlet to the vacuum pump 20. In this particular embodiment, the flow demand sensor 52 is embodied as a pressure sensor that calculates the pressure drop through the vacuum installation 2 between the vacuum chamber 4 and the inlet to the vacuum pump 20. The flow demand sensor 52 may alternatively be connected downstream of the vacuum chamber 4 and the cyclone inlet valve 28A should regulations require this to be isolated from the vacuum chamber 4.

Second cyclone block 12B, including four cyclones 10E-H, is substantially identical to first cyclone block 12A and will not be described in further detail at this point. It is connected in parallel to first cyclone block 12A, between the vacuum chamber 4 and the vacuum pump 20 and includes cyclone inlet valve 28B, common collector 14B, dry level detector 30B, liquid level detector 32B, flush valve 34B, cyclone selector valves 36E-H, pressure sensor 38B, vent 40B, vent valve 42B and vacuum pump inlet valve 44B. FIG. 2 also shows controller 50, which is connected to control the vacuum pump 20, cyclone inlet valves 28A, B, flush valves 34A, B, cyclone selector valves 36A-H, vent valves 42A, B and vacuum pump inlet valves 44A, B. The controller is also arranged to receive signals from pressure sensors 38A, B dry level detectors 30A, B, liquid level detectors 32A, B, flow demand sensor 52 and other appropriate locations within the vacuum installation 2 that may be required. The connections are shown schematically and may be wireless or otherwise as the case may be.

In the configuration according to FIG. 2, the controller 50 is operated to cause the vacuum pump to operate at its full capacity. The flow demand sensor 52 registers the pressure drop across the installation 2 and provides this information to the controller 50, which sets all of the cyclone selector valves 36A-H to their open position. The cyclone inlet valves 28A, B, and vacuum pump inlet valves 44A, B are also in their open positions. Air is aspirated from the vacuum chamber 4 through inlet valves 28A, B to both cyclone blocks 12A, 12B where it passes in parallel through all eight cyclones 10A-H. In the cyclones 10A-H the vortex flow causes particulate material entrained by the flow to be forced towards the outside where it decelerates and drops through the lower axial outlets into the common collectors 14A, B. Relatively clean air exits the cyclones 10A-H through upper axial outlets and cyclone selector valves 36A-H and filters 16A, B to the vacuum pump 20.

Figure 3:
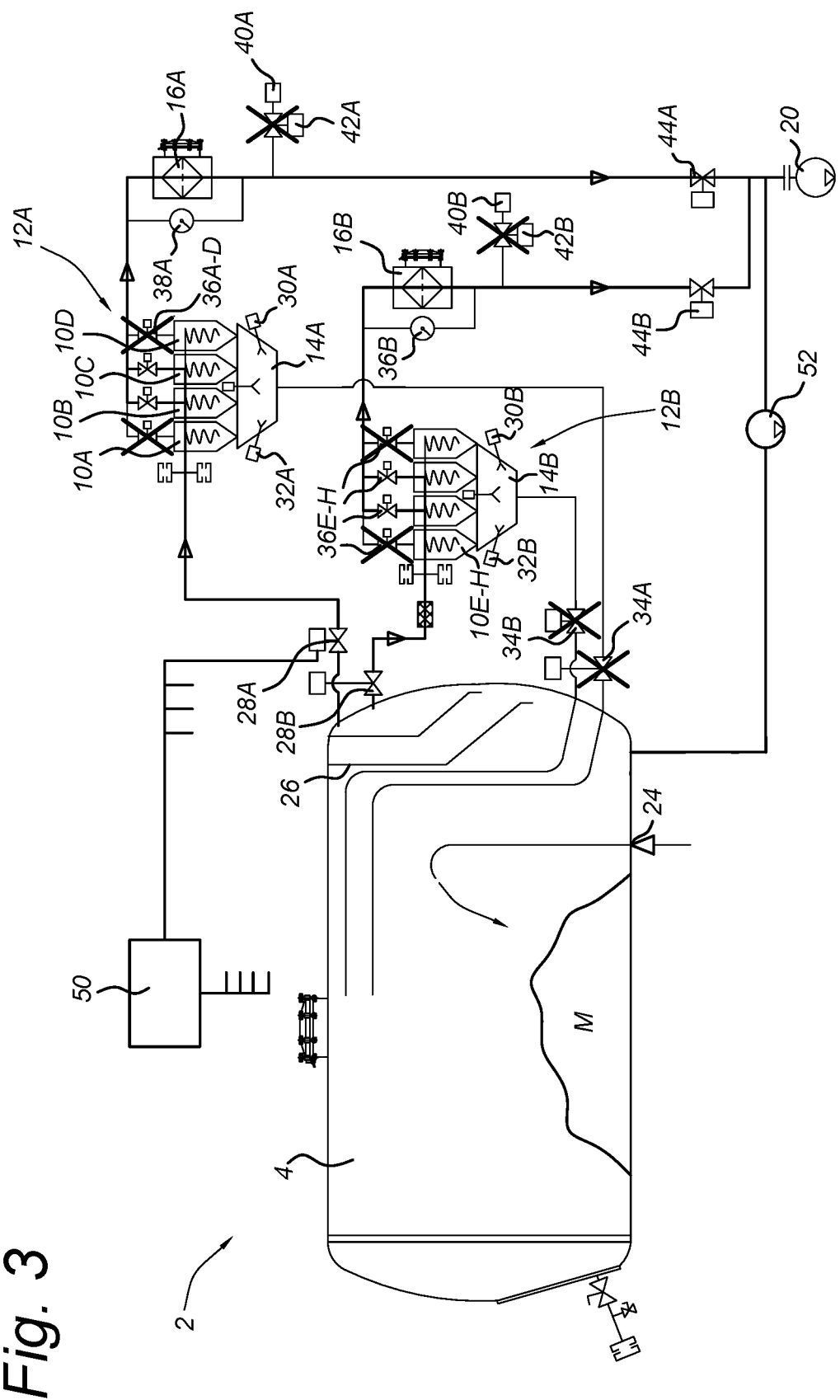
FIG. 3 shows a schematic view of the vacuum installation of FIG. 1 operating at partial flow.

FIG. 3 illustrates operation of the vacuum installation 2 of FIGS. 1 and 2 in partial flow mode. As indicated above, each of the cyclones 10A-H is configured for optimal operation at around 1100 m3/hour. At lower flow rates, separation of particulates is less effective, which may lead to an increase of particulates passing through the cyclone and being trapped by the filters 16A, B. According to the invention, and as illustrated in FIG. 3, the controller 50 is set to operate the vacuum pump at a flow rate of 50%. In response to detection of a lower pressure drop across flow demand sensor 52, the controller 50 closes four of the cyclone selector valves 36A, D, E, H so that flow takes place only through cyclones 10B, C, F, G. Since the number of cyclones is also reduced by 50%, the flow through each cyclone remains at the rated value for the cyclone and optimal separation of particulates takes place. Each filter 16A, 16B is subject to a reduced flow rate, leading to a lower pressure drop at pressure sensors 38A, B and more efficient operation. It will be understood that the vacuum installation 2 may be operated with any number of the cyclones 10A-H operational, giving eight different flow rates, each ensuring optimal operation of the respective cyclones. Furthermore, although in the above illustration, each of the cyclones is identical, cyclones of different capacities may be implemented in order to provide still further variation in flow rate, in particular for operation with different materials to be separated.

Although reference is made to a controller 50, it will be understood that the speed of the vacuum pump 20 may be set by a first controller and the evaluation of the subsequent valve settings may be governed by a second controller and the present wording is not intended to be restrictive on the location where such control takes place. According to an embodiment, the controller 50 operates to open and close the cyclone selector valves 36A-H in a random cyclic manner in order to always maintain four of the cyclones 10A-H operational. In this manner, the wear of each cyclone 10 and its respective valves will be equalised. It will be understood that a non-random process may also be employed.

Figure 4:
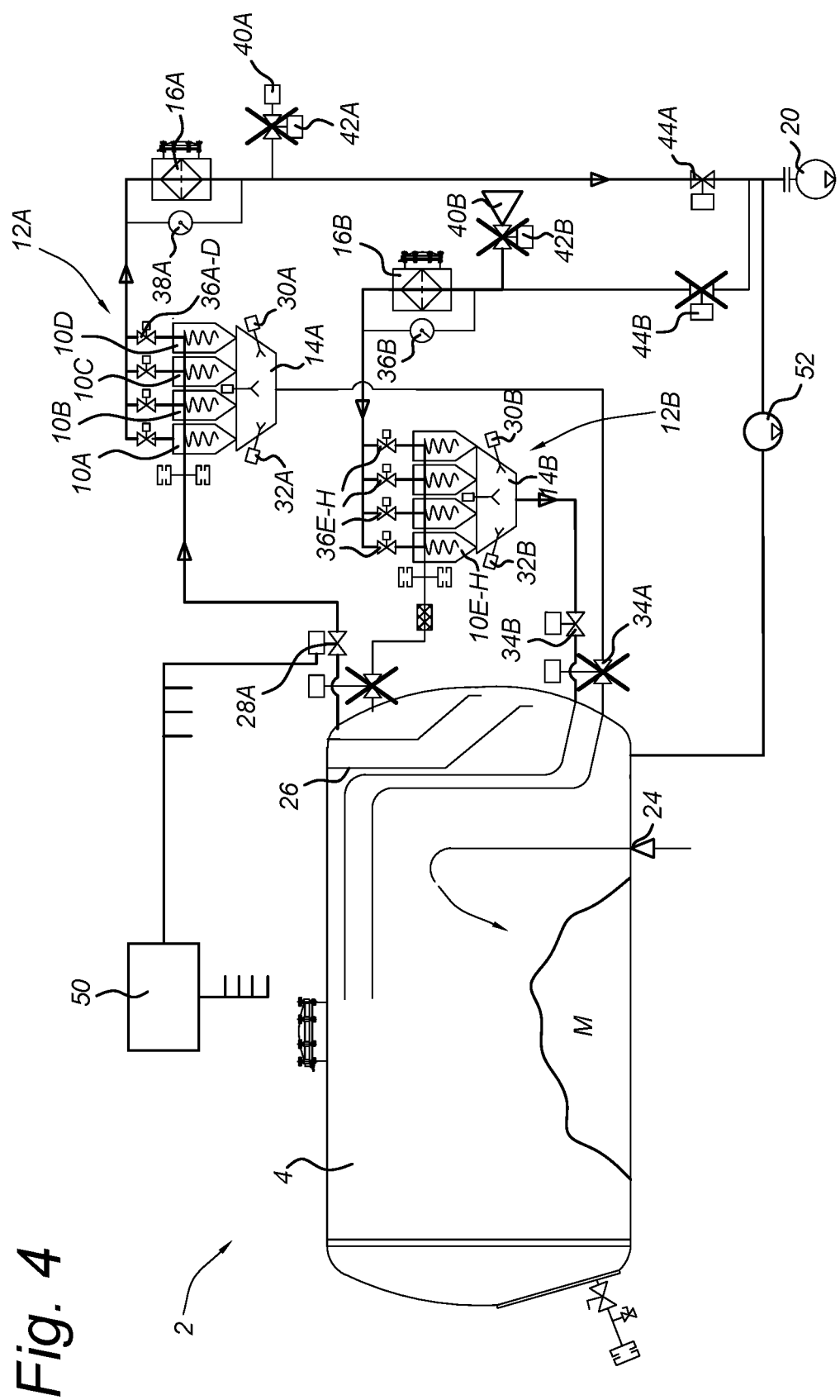
FIGS. 4 and 5 show schematic views of the vacuum installation of FIG. 1 during flushing.

FIG. 4 illustrates operation of the vacuum installation 2 of FIGS. 1 and 2 during flushing of the second cyclone block 12B. In this configuration, the controller 50 has opened all cyclone selector valves 36A-D in the first cyclone block 12A so that all four cyclones 10A-D are operational. The cyclone inlet valve 28B to the second cyclone block 12B is closed. In order to commence the flush, flush valve 34B and all of the cyclone selector valves 36E-H must be open and vacuum pump inlet valve 44B is closed. At this point, vent 40B is opened by opening vent valve 42B. This causes a shock of air to be sucked in through the vent 40B in the direction of the vacuum chamber 4. The shock travels in reverse direction through the filter 16B causing dislodgement and entrainment of particulates retained by the filter and proceeds through the cyclones 10E-H from their upper axial outlets through their lower axial outlets to the collector 14B. Material that has been deposited in the collector 14B will be flushed out through the flush valve 34B and back into the vacuum chamber 4. The flushing time can be set by the controller 50 according to the material being aspirated, with the vent 40B being opened for between 0.1 and 2 seconds.

Figure 5:
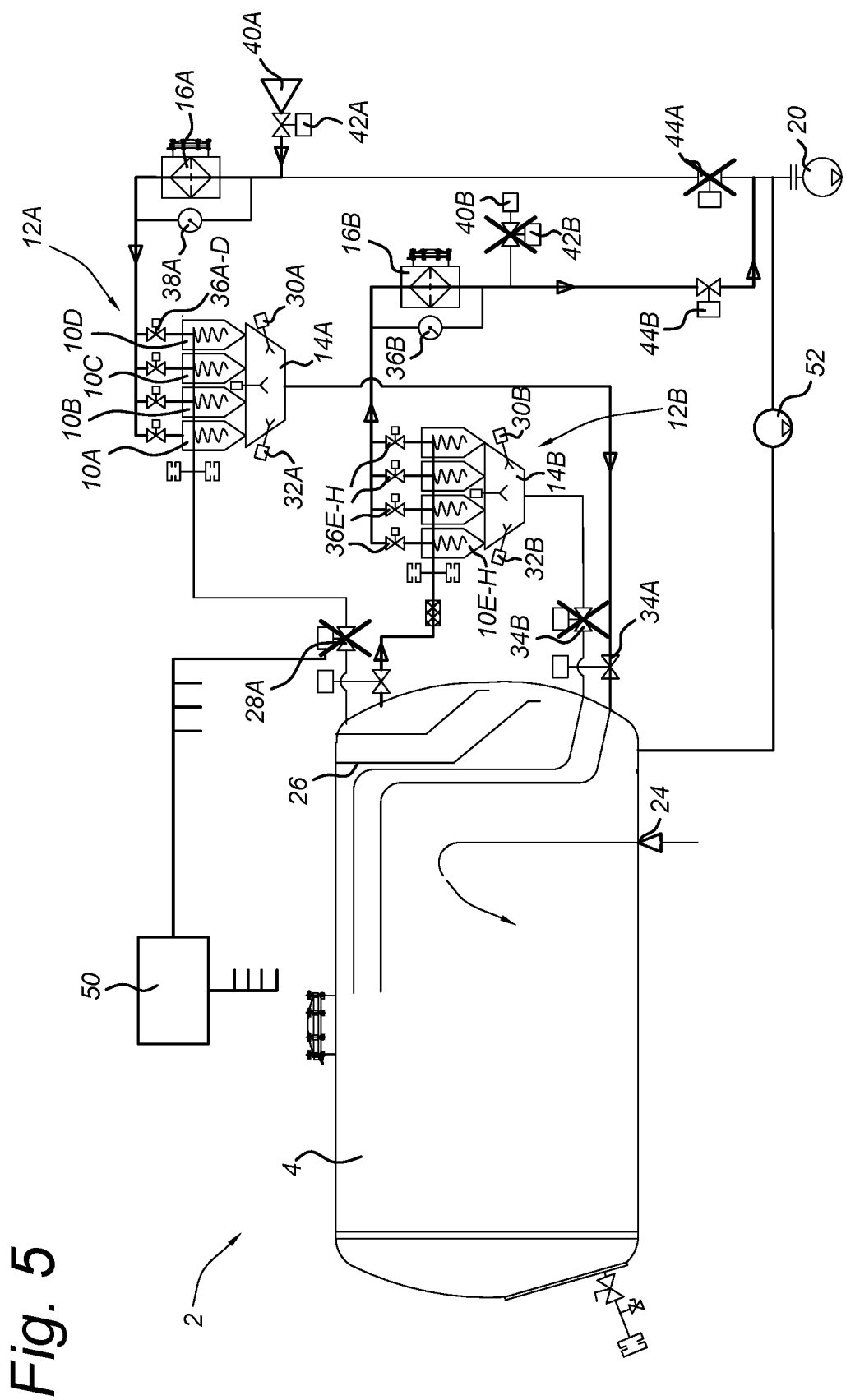

FIG. 5 illustrates operation of the vacuum installation 2 of FIGS. 1 and 2 during subsequent flushing of the first cyclone block 12A. In this configuration, the controller 50 has opened the cyclone inlet valve 28B to the second cyclone block 12B whereby the four cyclones 10E-H are operational again. The cyclone inlet valve 28A to the first cyclone block 12A is now closed. In order to commence the flush, flush valve 34A must be opened and vacuum pump inlet valve 44A is closed. At this point, vent 40A is opened by opening vent valve 42A. The shock of air entering vent 40A passes in reverse through filter 16A, cyclones 10A-D and collector 14A. Material that has collected in the filter 16A or has been deposited in the collector 14A will be flushed out through the flush valve 34A and back into the vacuum chamber 4.

Flushing may take place periodically or in response to signals generated by either one of the pressure sensors 38A, B. If the controller 50 registers a pressure drop across one of the filters 16 A, B that is outside acceptable limits, it may initiate a flushing cycle for that filter. If this alleviates the problem, operation may continue. Should an overpressure across the respective filter remain, the controller 50 may generate a warning to the operator or may shut down the installation 2.

Flushing may also take place in response to excess material collecting in either of the collectors 14A, B. Dry level detectors 30A, B and liquid level detectors 32A, B can provide the controller 50 with an indication if excess materials have collected within the respective collector 14A, B. In that case, flushing of the relevant collector can be initiated to remove the material.

Thus, the invention has been described by reference to certain embodiments discussed above. It will be recognized that these embodiments are susceptible to various modifications and alternative forms well known to those of skill in the art. In particular, the arrangement of valves in FIGS. 2 to 5 may be varied according to the manner in which flushing is to be carried out and according to which cyclones are to be grouped together. Additional filters may be provided as required as may additional inlets and accessories for the vacuum chamber.

Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A vacuum installation for industrial application comprising:
   a vacuum chamber having an inlet for aspirating a quantity of liquid or particulate material and an interior configured to allow aspirated material to settle therein;
   a cyclone separation unit comprising a plurality of cyclones, communicating in parallel to each other with the interior of the vacuum chamber;
   a vacuum pump connected to the cyclone separation unit to draw air through the inlet into the vacuum chamber and from the vacuum chamber through the cyclones to induce a separating vortex flow within the cyclones and thereby avoid entrained material from passing to the vacuum pump; and
   a controller, arranged to control the vacuum pump to provide a chosen flow rate, the controller being further arranged to selectively deactivate one or more of the cyclones in order to back flush the deactivated cyclones to the vacuum chamber while continuing to aspirate through active cyclones, wherein the cyclone separation unit comprises a plurality of collectors arranged to receive separated material, each collector provided with a respective flush valve connecting the collector to the interior of the vacuum chamber, and the controller selectively operates the flush valves to back flush the separated material from one or more of the collectors back into the interior of the vacuum chamber.

2. The vacuum installation according to claim 1, wherein the controller is arranged to selectively activate and deactivate cyclones successively.

3. The vacuum installation according to claim 1, wherein all cyclones are rated to operate at the same optimal flow rate.

4. The vacuum installation according to claim 1, wherein the controller is arranged to control the flow rate through the vacuum pump to a plurality of preselected flow rates each corresponding to a number of activated cyclones.

5. The vacuum installation according to claim 1, further comprising a plurality of filters between the cyclones and the vacuum pump and the controller is arranged to back flush air through one or more of the filters, while other filters remain operational.

6. The vacuum installation according to claim 5, further comprising an aspiration valve arrangement for each filter or group of filters whereby a connection to the vacuum pump may be closed and a connection to the atmosphere may be opened and the controller is arranged to selectively activate a given aspiration valve arrangement associated with the deactivated cyclone or cyclones.

7. The vacuum installation according to claim 1, wherein the cyclone separation unit comprises a plurality of cyclone blocks, each block having a collector serving a plurality of cyclones and the controller is arranged to selectively back flush each of the cyclone blocks.

8. The vacuum installation according to claim 7, wherein the cyclones in each cyclone block are connected in parallel through the same filter to the vacuum pump.

9. The vacuum installation according to claim 7, wherein the cyclones in each cyclone block are connected in parallel through the same aspiration valve arrangement to the vacuum pump.

10. The vacuum installation according to claim 1, further comprising a flow demand sensor arranged to output an indication of the flow rate through the installation and the controller is arranged to selectively deactivate the one or more of the cyclones in response to the output from the flow demand sensor.

11. A vacuum truck comprising a vacuum installation according to claim 1.

12. The vacuum installation according to claim 1, wherein the vacuum installation is a high vacuum installation.

13. The vacuum installation according to claim 12, wherein the high vacuum installation operates with a vacuum pump operable to a vacuum of at least 0.6 bar.

14. The vacuum installation according to claim 12, further comprising one or more silencers.

15. A method of operating a vacuum installation to aspirate a quantity of liquid or particulate material in an industrial application, the vacuum installation comprising a vacuum pump, a plurality of cyclones communicating in parallel to each other with the interior of a vacuum chamber having an inlet for aspiration of the material, the interior of the vacuum chamber configured to allow aspirated material to settle therein, and a plurality of collectors each provided with a respective flush valve connecting the collector to the interior of the vacuum chamber, the method comprising:
operating the vacuum pump to draw aspirated material into the vacuum chamber through the inlet and provide a desired flow rate through the cyclones to induce a separating vortex flow within the cyclones whereby entrained material is separated and collected in the collectors;
selectively deactivating one or more of the cyclones;
selectively operating the flush valves to back flush the one or more deactivated cyclones in order to clean at least part of the flow path by back flushing the separated material from one or more of the collectors back into the interior of the vacuum chamber.

16. The method of claim 15, wherein the cyclones are selectively deactivated in sequence.

17. The method of claim 15, further comprising measuring a desired flow rate through the inlet by determining a pressure drop between the vacuum chamber and an inlet to the vacuum pump.

18. The method of claim 15, wherein the vacuum installation is a high vacuum installation.

19. The method of claim 15, further comprising continuing to aspirate through one or more active cyclones.

20. The vacuum installation according to claim 1, further comprising baffles located in the interior of the vacuum chamber, wherein the cyclones are connected with the interior of the vacuum chamber downstream from the baffles and the collectors are connected via their respective flush valves to the interior of the vacuum chamber upstream of the baffles.

21. A vacuum installation for industrial application comprising:
a vacuum chamber having an inlet for aspirating a quantity of liquid or particulate material and an interior configured to allow aspirated material to settle therein;
a cyclone separation unit comprising a plurality of cyclones, communicating in parallel to each other with the interior of the vacuum chamber, and a plurality of collectors arranged to receive separated material from the plurality of cyclones, each collector being provided with a connection to the interior of the vacuum chamber, allowing a back flush of separated material from the respective collector back into the interior of the vacuum chamber;
a vacuum pump connected to the cyclone separation unit to draw air through the inlet into the vacuum chamber and from the vacuum chamber through the cyclones to induce a separating vortex flow within the cyclones and thereby avoid entrained material from passing to the vacuum pump; and
baffles located in the interior of the vacuum chamber, wherein the cyclones are connected with the interior of the vacuum chamber downstream from the baffles and the collectors are connected to the interior of the vacuum chamber upstream of the baffles.

\* \* \* \* \*